United States Patent [19]
Van Der Lely

[11] 3,791,052
[45] Feb. 12, 1974

[54] TRACTOR COMPRISING A PIVOTABLE DRIVER SEAT

[76] Inventor: Cornelis Van Der Lely, 7, Bruschenaain, Zug, Switzerland

[22] Filed: Jan. 25, 1971

[21] Appl. No.: 109,311

[30] Foreign Application Priority Data
Jan. 26, 1970 Netherlands.................... 7001034
Feb. 19, 1970 Netherlands.................... 7002381

[52] U.S. Cl........................... 37/8, 37/43 E, 37/82, 37/108 R, 37/117.5, 37/124, 172/435, 180/1 R, 214/131 A
[51] Int. Cl............................................ A01b 35/00
[58] Field of Search...... 198/7, 8, 11; 214/522, 508, 214/509, 131 A, 145; 172/435; 56/DIG. 9; 180/9.28; 37/8, 43 E, 82, 108 R, 117.5, 124

[56] References Cited
UNITED STATES PATENTS
| | | | |
|---|---|---|---|
| 1,355,853 | 10/1920 | Habsburg-Lothring........ | 180/9.28 X |
| 1,729,374 | 9/1929 | EhrHart....................... | 180/9.28 |
| 1,848,532 | 3/1932 | Lang........................... | 198/11 |
| 2,325,833 | 8/1943 | Cook........................... | 198/11 |
| 2,696,287 | 12/1954 | Foust.......................... | 198/8 |
| 3,233,765 | 2/1966 | Barnes......................... | 214/500 |
| 3,254,900 | 6/1966 | Allen........................... | 280/29 |
| 3,398,984 | 8/1968 | Ajero.......................... | 180/1 R |
| 3,568,778 | 3/1971 | Swisher....................... | 180/77 S X |
| 3,263,844 | 8/1966 | Spellman..................... | 214/508 |

FOREIGN PATENTS OR APPLICATIONS
| | | | |
|---|---|---|---|
| 1,144,504 | 3/1969 | Great Britain................ | 214/131 A |
| 118,318 | 12/1969 | Norway....................... | 214/131 A |

*Primary Examiner*—Gerald M. Forlenza
*Assistant Examiner*—Frank E. Werner
*Attorney, Agent, or Firm*—Mason, Mason & Albright

[57] ABSTRACT

A tractor has a driver seat mounted on a body which is preferably flat. The seat is connected to the frame by a pivotable arm so that the seat can be moved laterally relative to the remainder of the tractor. The tractor has a hydraulic system, including lifts and supports which can furnish support and connection for earth moving attachments.

13 Claims, 21 Drawing Figures

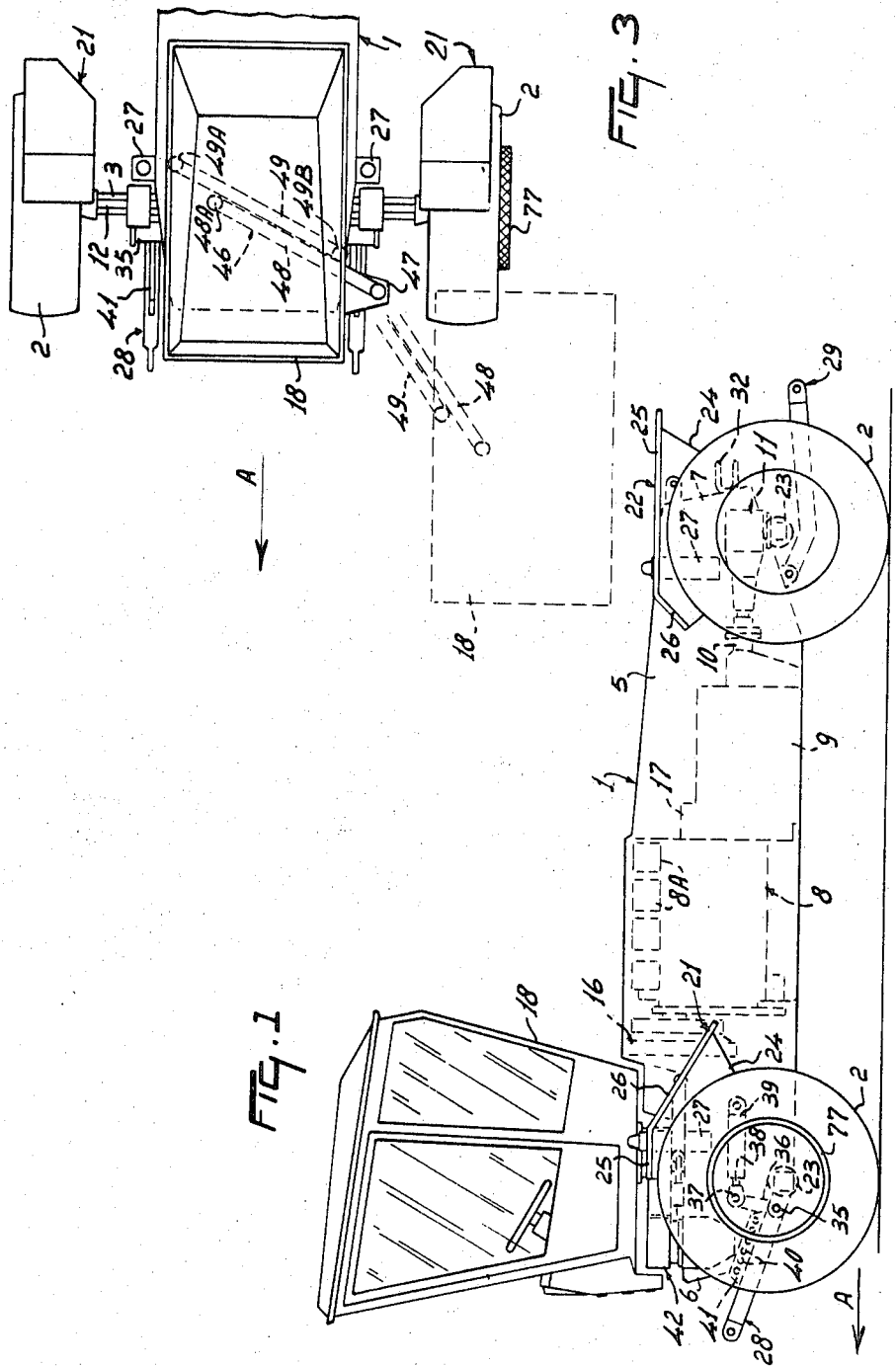

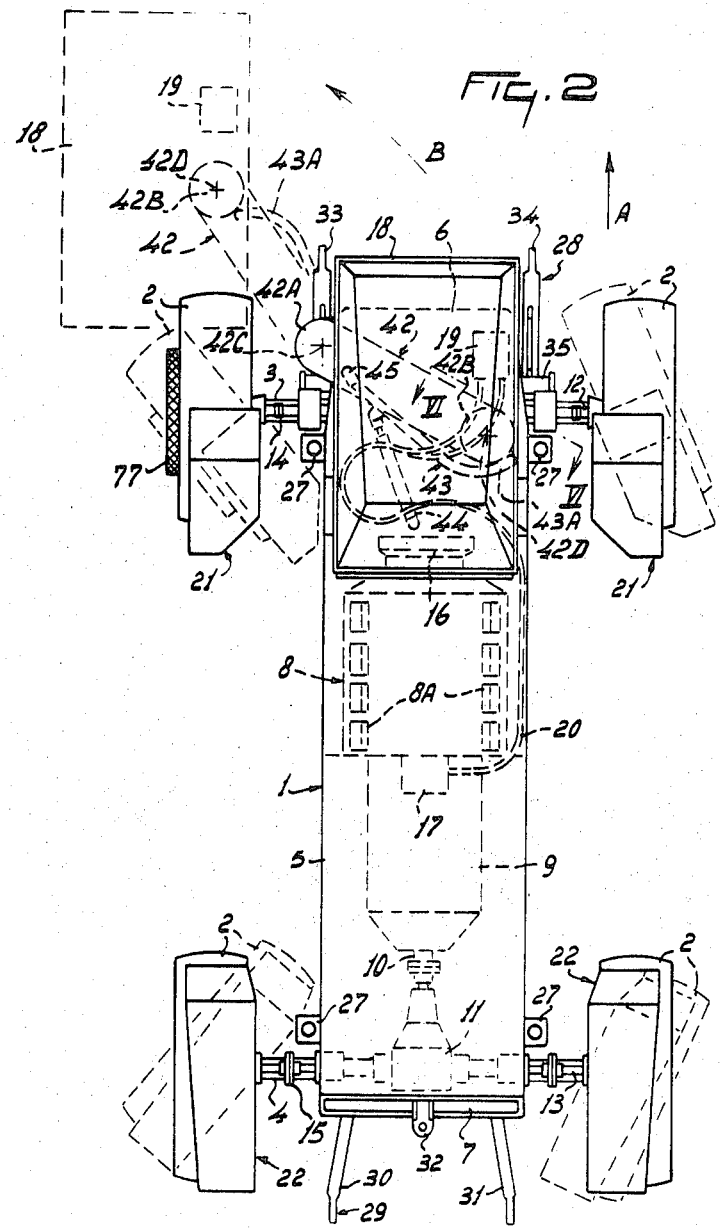

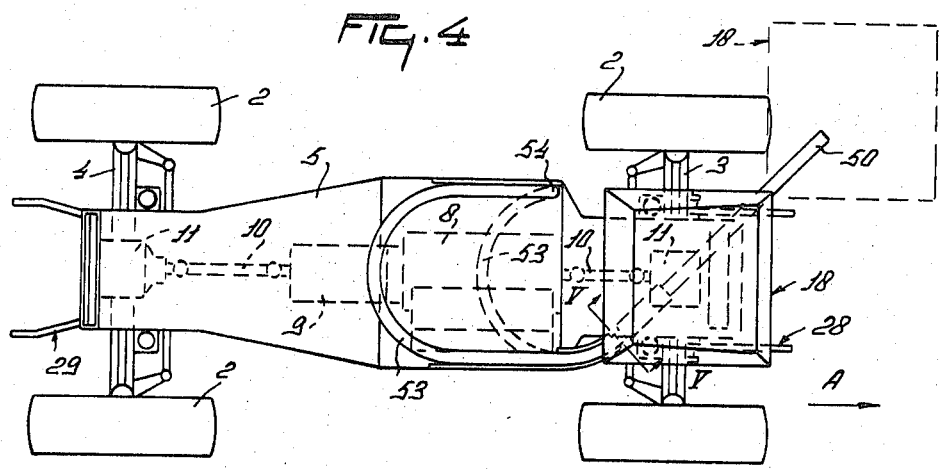
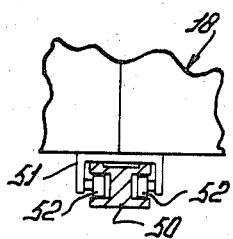

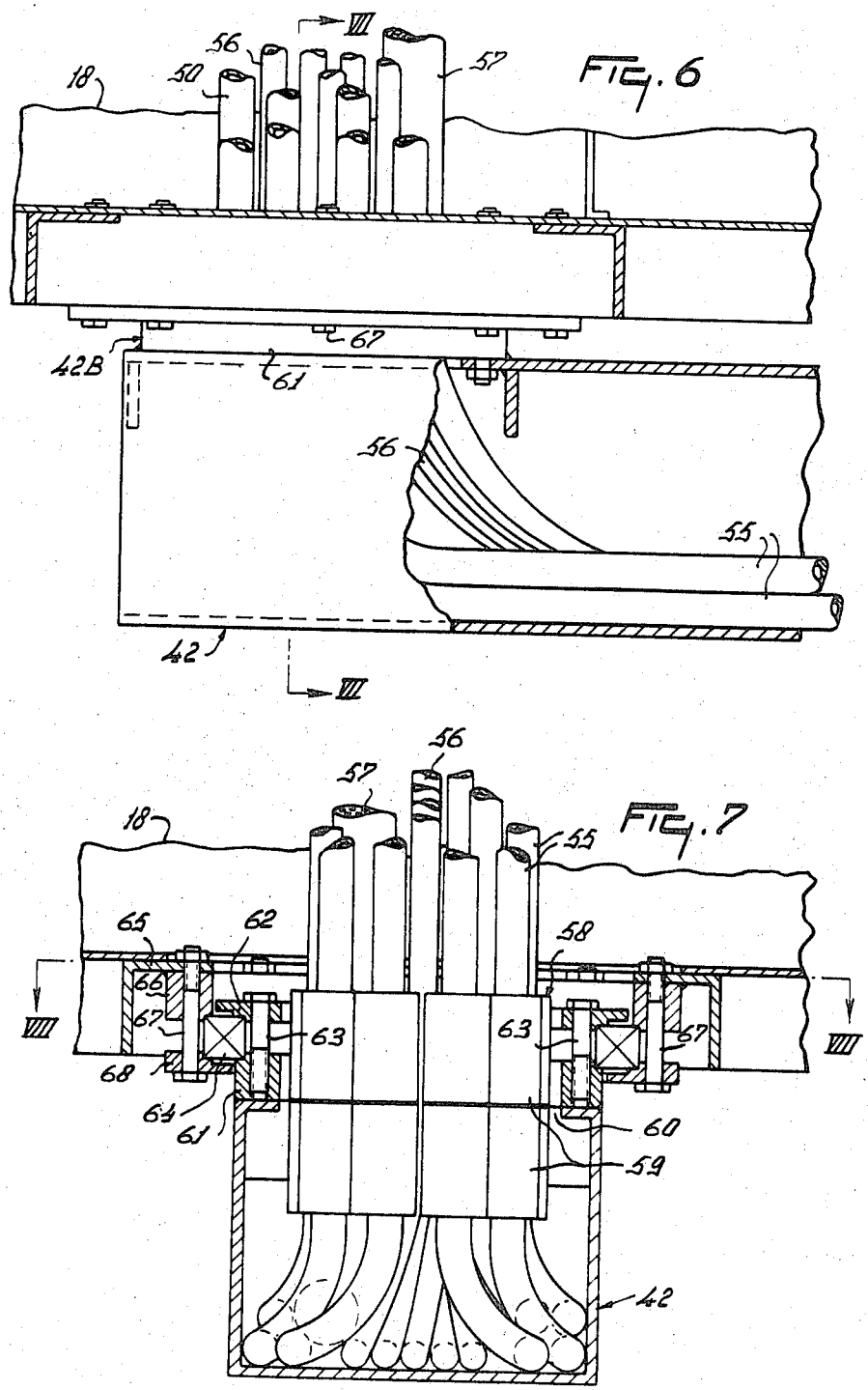

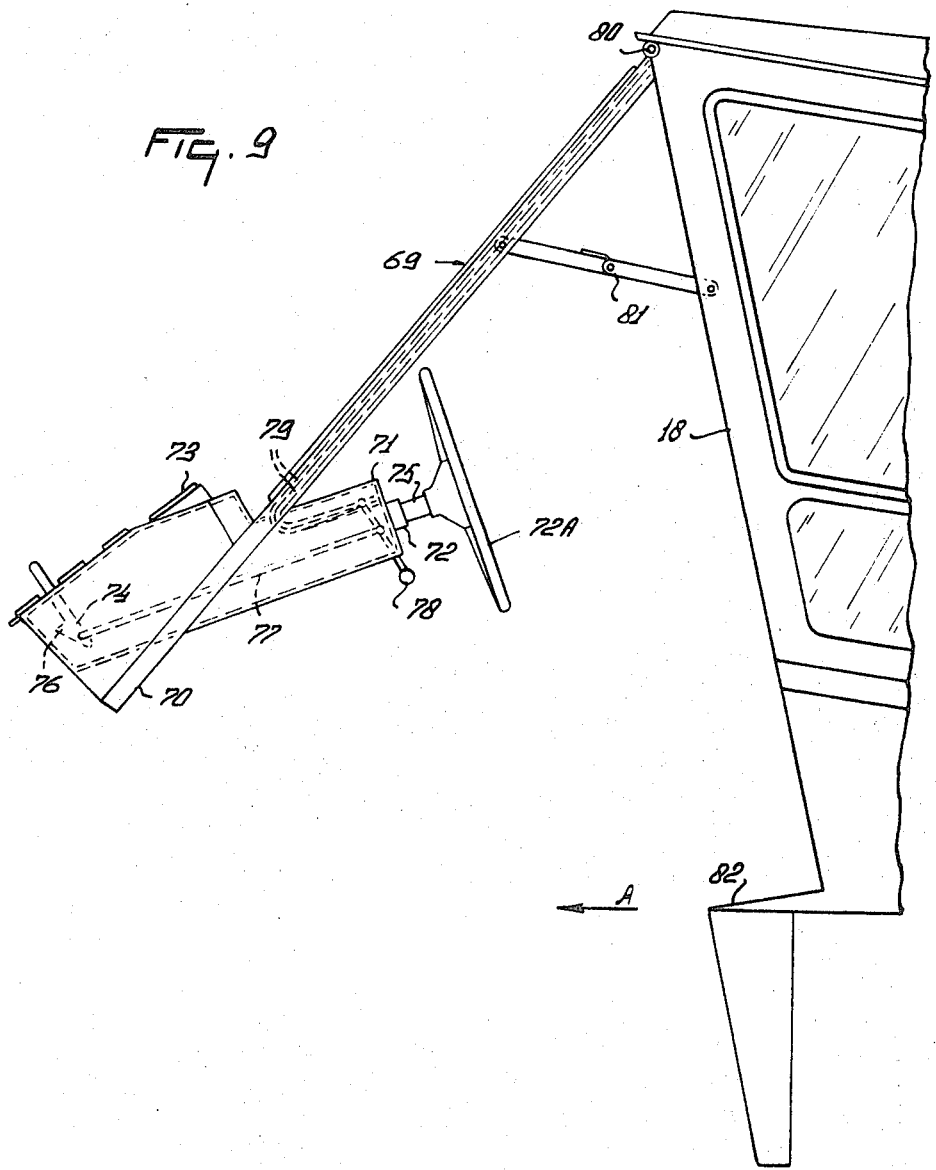

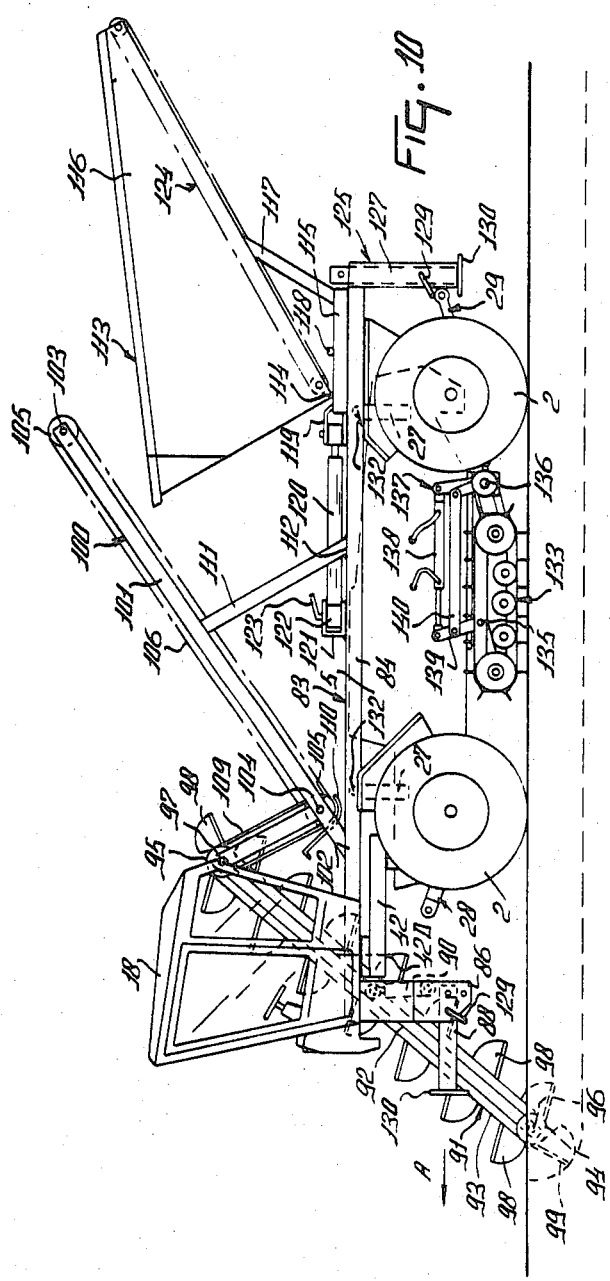

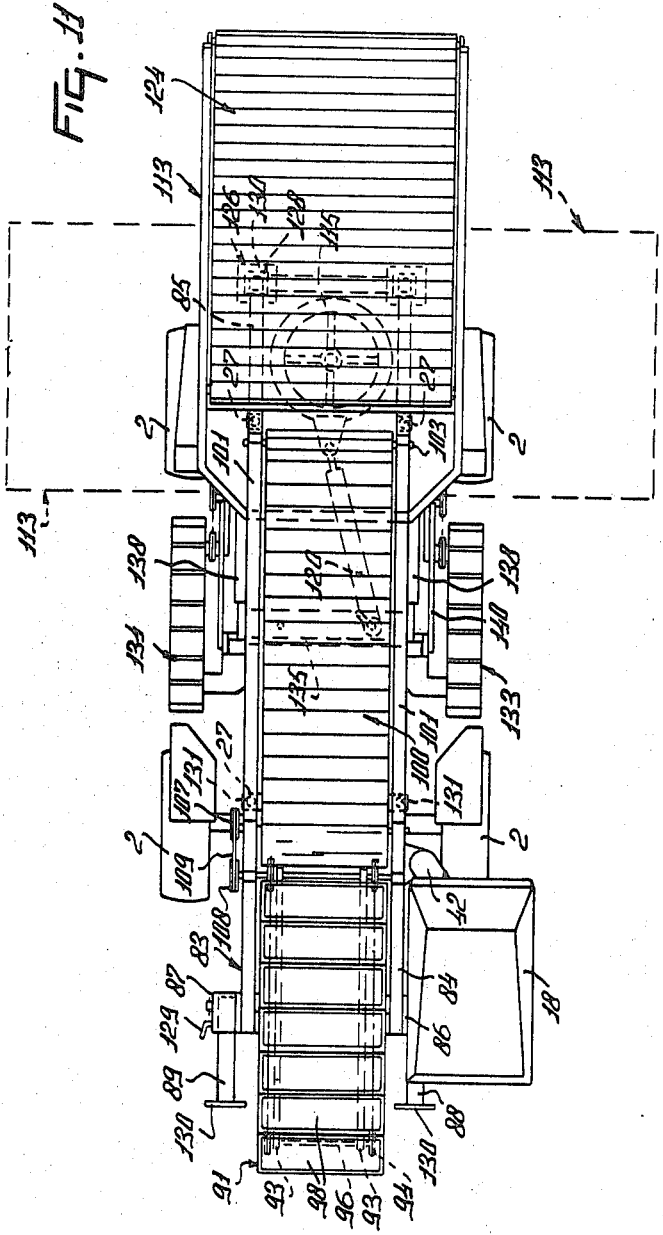

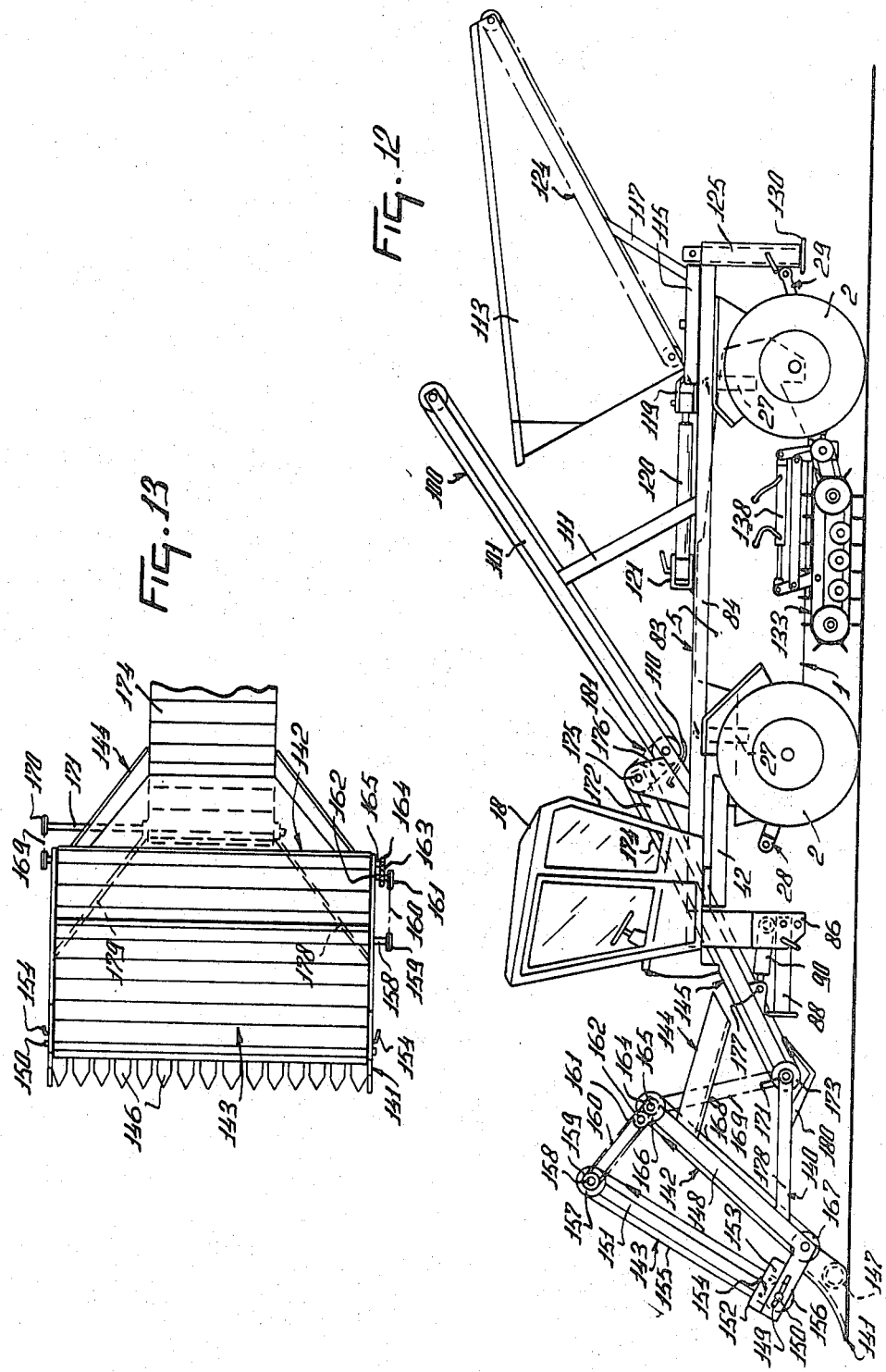

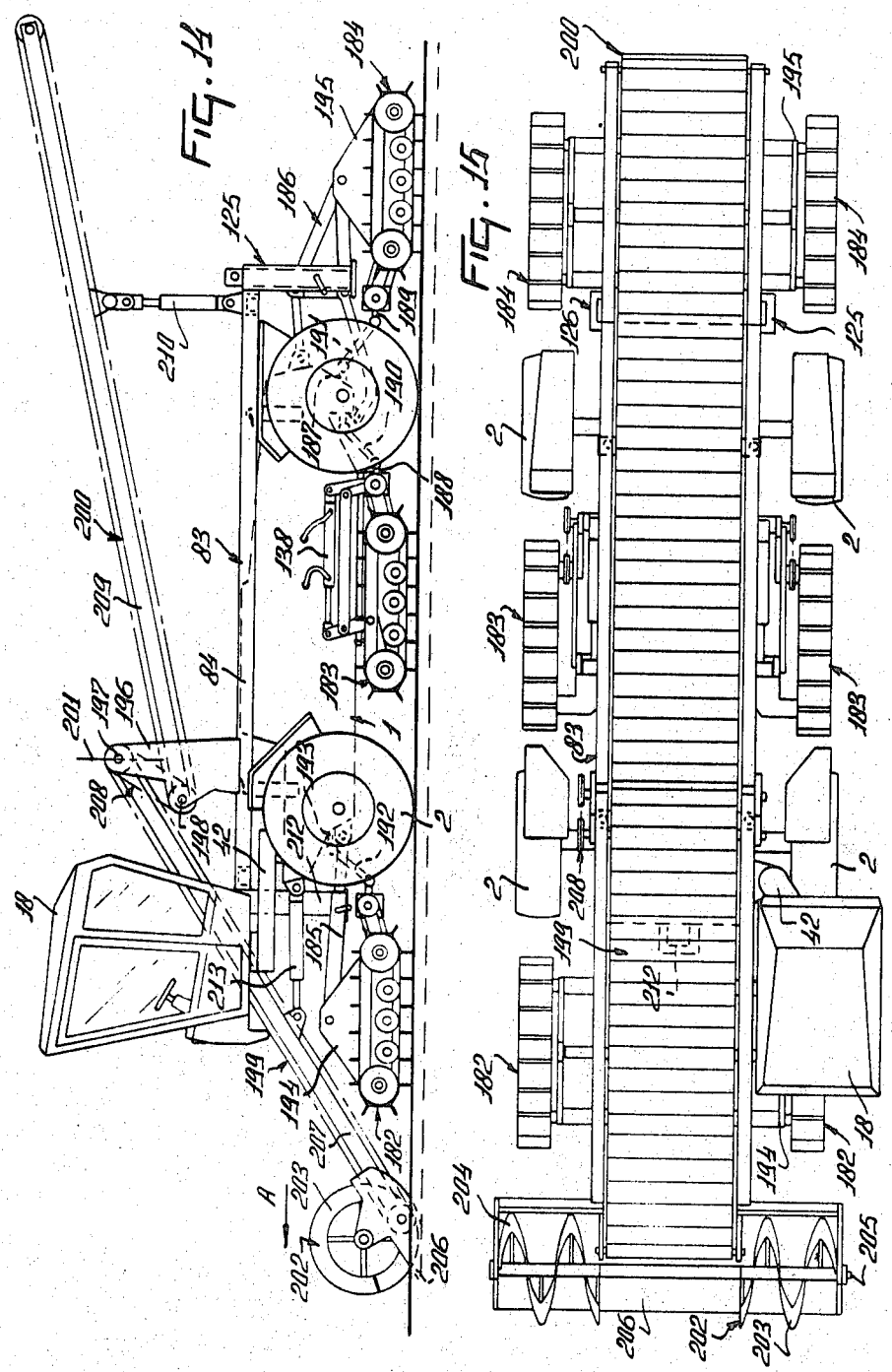

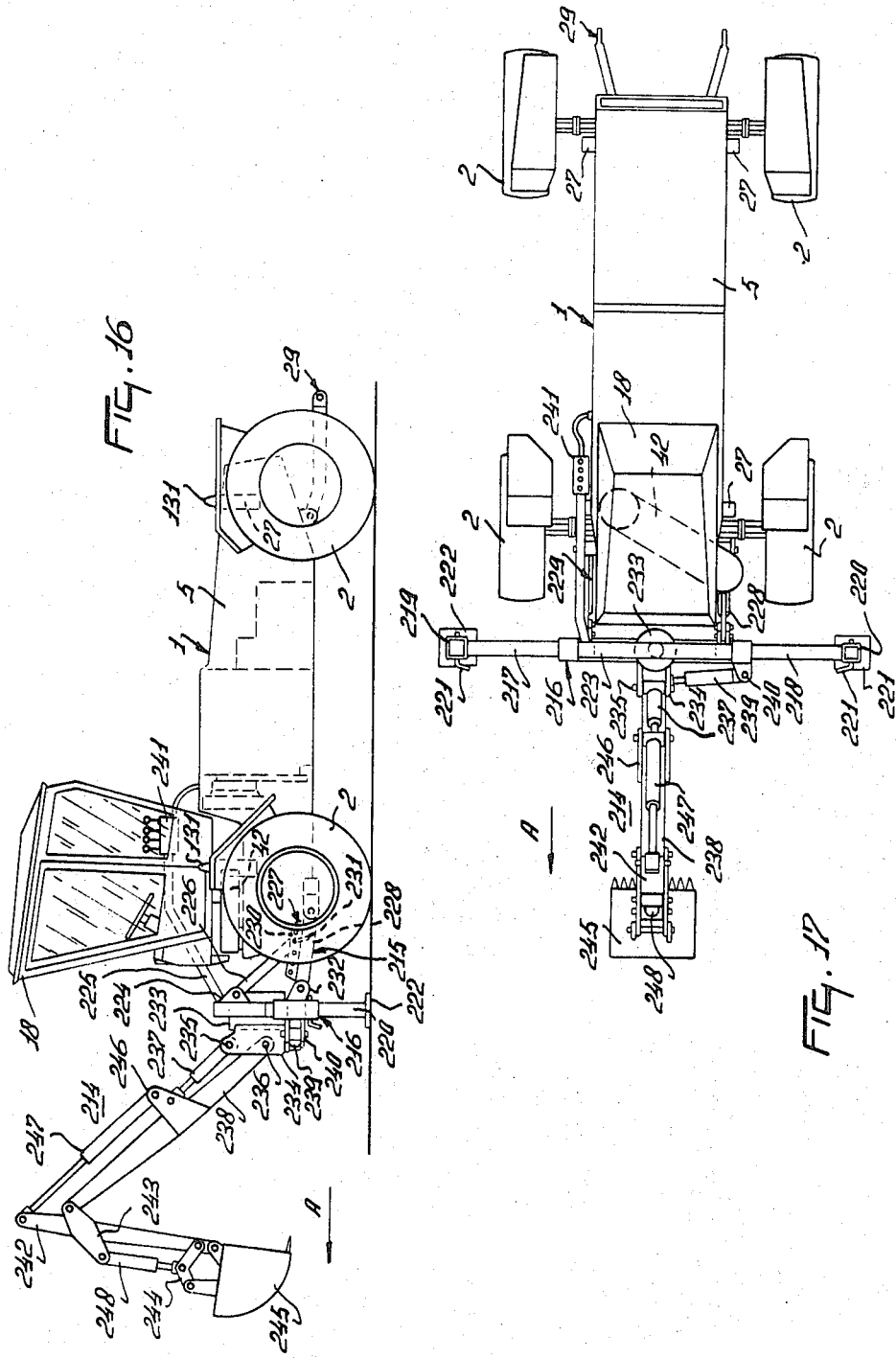

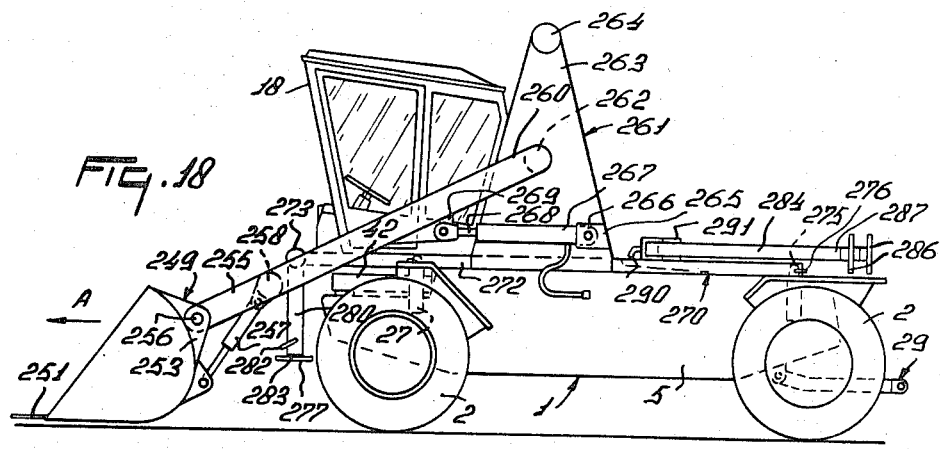
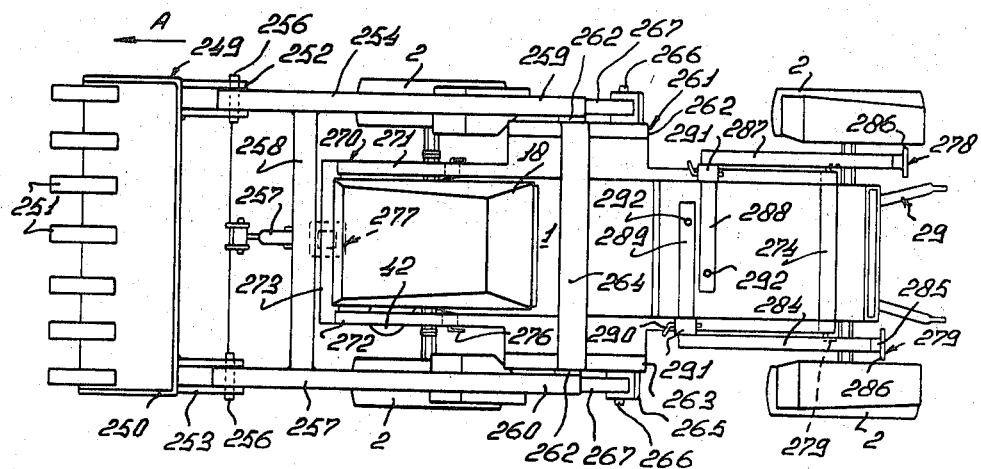

Patented Feb. 12, 1974
3,791,052
13 Sheets—Sheet 13
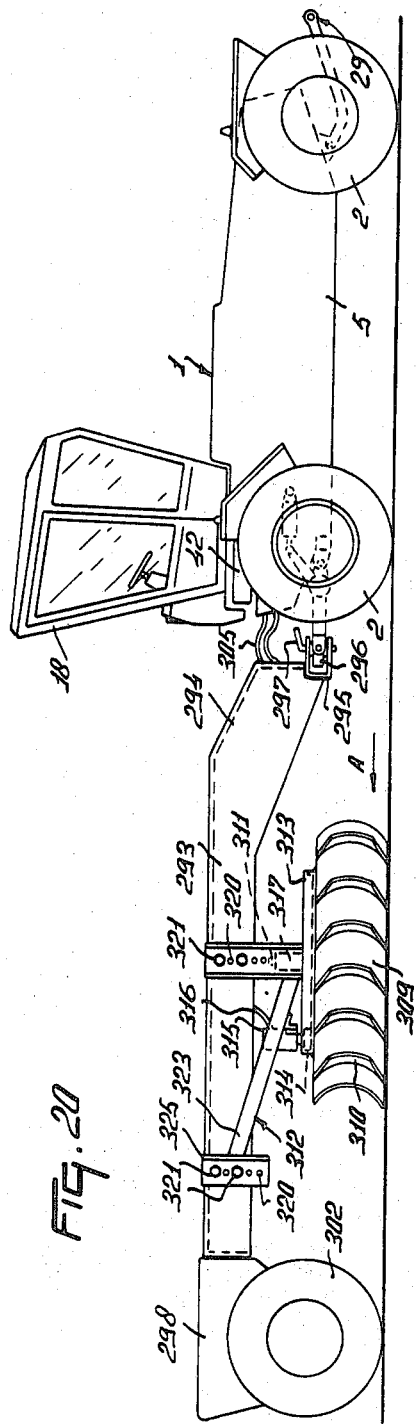
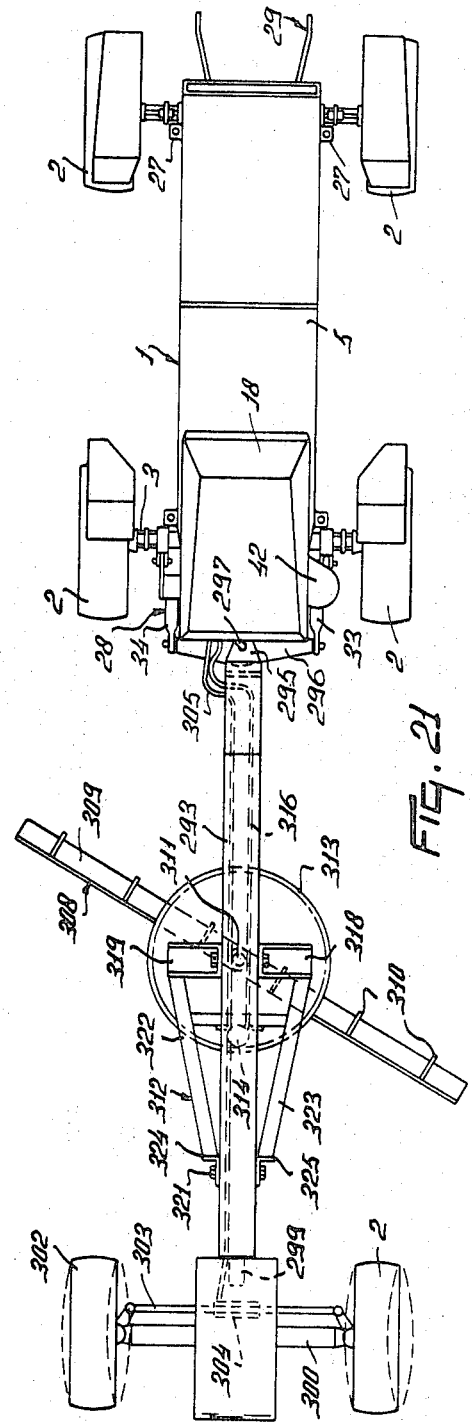
INVENTOR
CORNELIS VAN DER LELY
BY
Mason, Mason & Albright
Attorneys

TRACTOR COMPRISING A PIVOTABLE DRIVER SEAT

The invention provides a tractor whose driver seat can be turned into various positions. For this purpose the driver seat can be moved into a first position in which it is located on plan between two front wheels of the tractor, while the driver seat can be displaced to a second position in which it is located near the front of a front wheel.

In this way the driver seat can be turned out of its central position into a position such that the top side of the tractor is completely available to hold a loading floor, a machine and/or a tool, whereas in operation a satisfactory supervision remains possible.

This tractor is particularly suitable for carrying road construction machinery, for example, excavators, levelling tools and the like, in which case the driver can satisfactorily supervise the excavation operation and the conveyance of the excavated material, this tractor having the important advantage that it is adapted to carry various kinds of machinery, tools and the like, so that capital investment is considerably reduced and the tractor is employed more intensely, which decreases the cost of exploitation.

For a better understanding of the invention and to show how the same may be carried into effect, reference will now be made, by way of example, to the accompanying drawings, in which:

FIG. 1 is a side elevation of a tractor embodying the invention.

FIG. 2 is a plan view of the tractor embodying the invention.

FIG. 3 is a plan view of part of a second embodiment of the tractor.

FIG. 4 is a plan view of a third embodiment of the tractor.

FIG. 5 is an elevation taken in the direction of the arrows V—V in FIG. 4.

FIG. 6 is a side elevation of the connection of the supporting arm of the tractor with the driver seat or the cabin.

FIG. 7 is an elevation taken in the direction of the arrows VII—VII in FIG. 6.

FIG. 9 is a side elevation of the front portion of the tractor cabin.

FIG. 10 is a side elevation of an excavator arranged on a tractor.

FIG. 11 is a plan view of the combination shown in FIG. 10.

FIG. 12 is a side elevation of a second embodiment of an excavator arranged in a tractor.

FIG. 13 is a plan view of the front side of the excavator shown in FIG. 12.

FIG. 14 is a side elevation of a further embodiment of an excavator arranged on a tractor.

FIG. 15 is a plan view of the combination of FIG. 14.

FIG. 16 is a side elevation of a fourth embodiment of an excavator arranged on a tractor.

FIG. 17 is a plan view of the combination of FIG. 16.

FIG. 18 is a side elevation of a fifth embodiment of an excavator arranged on a tractor.

FIG. 19 is a plan view of the combination of FIG. 18.

FIG. 20 is a side elevation of a sixth combination of a soil plane coupled with a tractor.

FIG. 21 is a plan view of the combination of FIG. 20.

Figure 8:
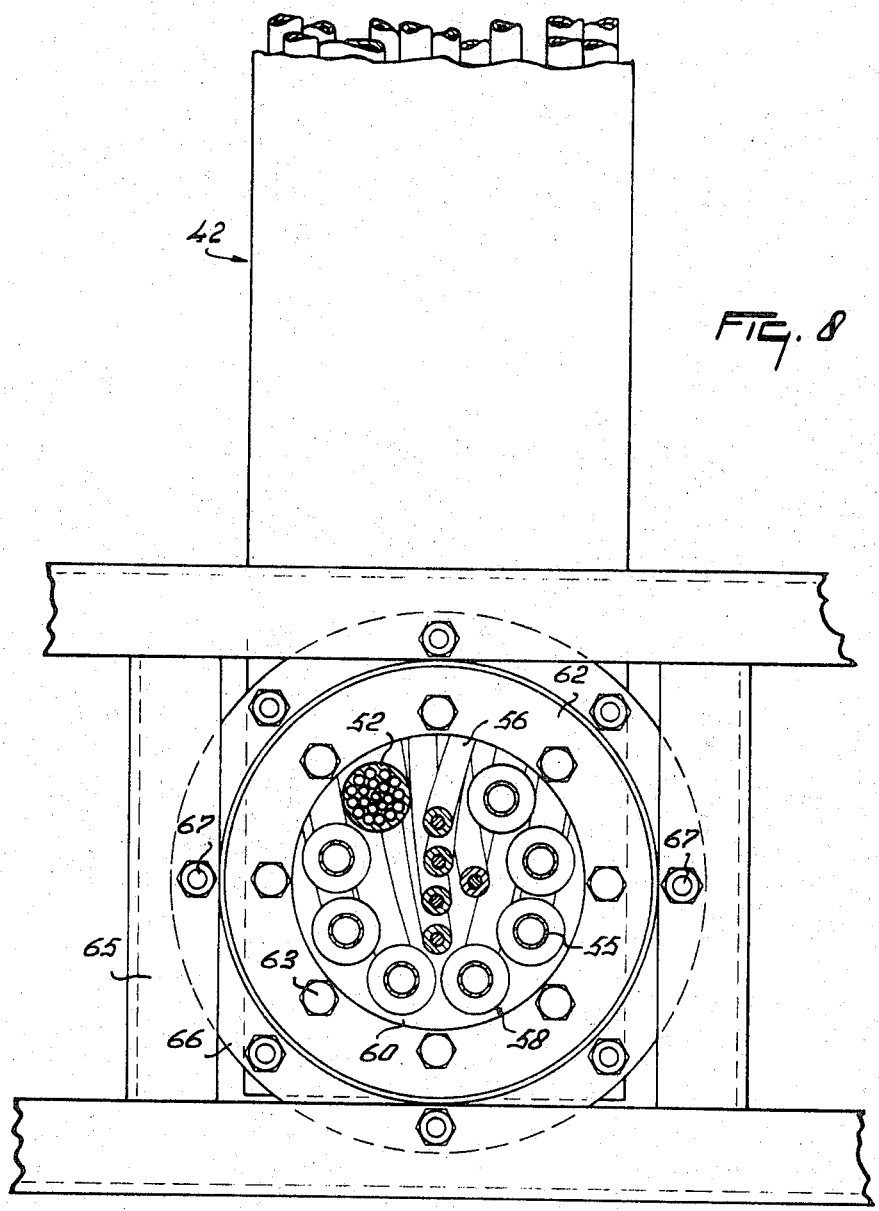
FIG. 8 is an elevation in the direction of the arrows VIII—VIII in FIG. 7.

As shown in the elevations of FIGS. 1 and 2 the tractor is equipped with four ground wheels 2, arranged pairwise on a front axle 3 and the back axle 4. The two axles hold the frame 5 of the tractor. In a preferred embodiment the frame 5 is formed by a structure of flat steel supporting sheets providing a low, comparatively narrow superstructure. The frame 5, which is completely closed with the exception of the front and rear sides 6 and 7 respectively, is appropriate for carrying the engine 8 with the subsequent change-speed gear 9. Driving shafts 10 extend towards the rear side and to the front of the tractor and terminate each in a differential housing 11, from which the front and rear wheels 2 are driven. For the sake of clarity of the drawings FIGS. 1 and 2 only show the portions 10 and 11 extending to the rear side of the tractor. In a preferred embodiment the engine 8 is formed by a V-8 Diesel engine, every four cylinders 8A of which are in line with each other. The power of this Diesel engine is more than 80 HP. The change-speed gear 9 is preferably a gear wheel system, but instead of using this gear wheel system a hydraulic change-speed gear may be successfully employed. The driving shafts 12 and 13 of the front and rear axles 3 and 4 respectively are provided with slip couplings 14 and 15 respectively, with the aid of which a safe transmission to the ground wheels 2 is ensured. Although this is not shown in detail in the Figures, the front and back wheels are adapted to be steered independently of each other. The heat exchanger or radiator 16 is arranged at the front of the engine 8, viewed in the direction of movement (arrow A). A control-casing 17 is provided on the rear side of the engine 8 and can be handled from the driver seat 18. For this purpose a flexible, loop-like tube 20 is provided between the control-mechanism 19 and the control-casing 17 so as to accommodate Bowden cables (not shown). The engine or the driving mechanism 8 of the tractor can thus be actuated in a cheap, but reliable manner. All main and auxiliary tools, for example, the parts 8, 9, 10, 11, 16 and 17 in a tractor embodying the invention are arranged in an air channel formed by the frame 5 and having inlet openings 6 at the front and an outlet opening 7 at the rear so that satisfactory cooling is ensured.

It is to be preferred to use the embodiment in which each ground wheel 2 is provided with a pivotable mud guard 21 and 22 respectively, each mud guard having a portion 24 connected with a hub 23 of a ground wheel so that each mud guard can turn with the direction of the axis of rotation of the ground wheel concerned. To the portion 24 are fastened at right angles two flat sheets 25 and 26 arranged at an obtuse angle. The sheet 25 is horizontal and the sheet 26 is oriented downwardly. In a preferred embodiment the sheet 25 of the foremost mud guard 21 is longer than that of the hindmost mud guard 22. However, the horizontal portion of the mud guard part 25 for the back wheels is longer than that of the front wheels.

The frame comprises furthermore four vertical hydraulic lifting cylinders 27. Each cylinder is arranged near the front or rear axle 3 or 4 respectively and near each ground wheel 2. By means of these lifting cylinders a loading trough, a loading floor, a machine or a tool can be arranged on the top side of the tractor and be carried along. At the front and at the rear of the tractor lifting devices 28 and 29 respectively are provided; the hindmost lifting device 29 comprises two supporting arms 30 and 31 and a draw ring 32. The lifting device 28 also comprises two supporting arms 33 and 34 (see FIG. 2), which are coupled in an advantageous embodiment with a shaft 35, extending transversely of the center line of the tractor 1. The shaft 35 is pivoted to the front axle 3 and is provided with an arm 36, rigidly secured thereto (see FIG. 1) and coupled with one end 37 of the piston rod 38 of a hydraulic cylinder 39, one end of which is pivoted to the frame 5. By changing the pressure in the cylinder 39 the shaft 35 is turned with the aid of the arm so that the supporting arms 33 and 34 are displaced upwardly. In an advantageous embodiment the supporting arms 33 and 34 are provided with a fastening strip 41, having openings 40, to which strips, for example, coupling parts of machines coupled with the supporting arms can be fastened in a plurality of positions.

At the front of the tractor 1 a driver seat is accommodated in a cabin 18 and is rotatably and pivotally connected, in a preferred embodiment, with a supporting or pivotal arm 42. This arm is adapted to pivot near its end portion 42A around the pivotal shaft 42C and connected with the frame 5 at a front place and the other end portion 42B is adapted to pivot about a hinge part 42D and pivotally connected with the cabin 18. In a preferred embodiment the length of the arm 42 is slightly more than half the length of the front axle 3. It is advantageous to use a hollow pivotal arm. With the arm 42 is coupled a steering rod 43, which in turn is pivotally coupled with a steering cylinder 44 (see FIG. 2). The steering rod 43 comprises a curved portion 43A, which is pivotably connected with hinge part 42D cabin-connected portion 42B of the arm 42. The other end portion 45 of the steering rod 43 is connected with the pivotal arm 42 near the end portion 42A. The supporting arm 42 and the steering rod 43, in the embodiment shown in FIGS. 1 and 2, form a pivoted structure, the arm and/or the rod being adapted to pivot about upwardly extending axes. Owing to the particular dimensions and dispositions of these arms the driver seat or cabin 18 can be turned so that the tractor driver can supervise all situations in driving and in operation.

It is to be preferred to use an embodiment in which the upwardly extending pivotal shaft 42C arranged in the end portion 42A of the arm 42 is located near the left-hand front side of the tractor 1 and near the left-hand front wheel 2 so that the driver seat can be completely turned towards the left-hand front of the tractor, as is shown in FIG. 2 by broken lines. It is furthermore advantageous that by using the special hollow pivotal arm 42 conductors, cables and the like and suchlike means required for driving and actuating the tractor and the tools can be passed through said arm so that they are protected against damage. This construction of the pivotal arm will be described in detail with reference to FIGS. 4, 5 and 6.

The tractor shown in FIGS. 1 and 2 operates as follows. When the tractor moves in the direction of the arrow A, the ground wheels occupy approximately the position indicated in FIG. 2 by solid lines. The cabin 18 is usually located centrally between the two front wheels. From the cabin 18 the speed of the tractor and all manipulations required for the operation of the tractor and of the machinery coupled herewith are controlled. Moreover, by actuating the steering cylinder 44 from the cabin 18 the latter can be turned towards the left-hand front side, i.e. to the proximity of the front side of the left-hand front wheel, as is indicated by broken lines in FIG. 2. The driver thus has a satisfactory survey of the tractor and the attached machinery, even if it is necessary, for example, to ride in the direction of the arrow B. The ground wheels 2 are turned from the cabin 18 into the position indicated by broken lines. With a tractor according to the invention it is advantageous that the cabin is turned over a short path so that the driver can rapidly pass from one working position to the other.

As is shown in FIG. 3, in which the steering cylinder 44 is omitted, the supporting arm 42 in conjunction with the steering rod 43 is replaced by a parallelogram structure 46 of rods or shafts. The left-hand front side of the tractor is provided with a supporting member 47, which holds a rod or shaft 48 adapted to pivot about a substantially vertical pivotal shaft, said rod being coupled by the end 48A with the lower side of the cabin 18. A second rod 49 is fastened by the end portion 49B near the supporting member 47 to the frame 5, whereas the other end portion 49A is fastened to the bottom side of the cabin 18. In the same manner as with the parallelogram structure of FIGS. 1 and 2 the cabin 18 can be turned through an angle of about 135° to 165° from the position central of the front wheels into a position near the front side of a front wheel and conversely and in each of these positions or in an intermediate position it can be fixed. The swinging movement is comparatively short.

In the embodiment shown in FIG. 4 the pivotal arm 50 of the cabin 18 is formed by a straight supporting beam, preferably an I-section beam (see FIG. 5), the length of which is approximately equal to the length of the front axle 3. The supporting arm 50 is disposed at an angle of 45° to the front axle 3 on the front part of the tractor 1. On the right-hand bottom side of the driver seat 18 a guide member formed by a channel-section beam 51 is provided, which is adapted to slide along the I-section beam 50. For this purpose the guide member 51 of FIG. 5 is provided with runners 52, which can be driven in known manner from the driver seat so that the driver seat can be displaced from the position shown in solid lines in FIG. 4 into the position indicated by broken lines and can be fixed in any intermediate position. It is advantageous to use the embodiment in which the guide member 51 has a length which is at least one tenth of the length of the supporting arm 50. This provides a swing-free hold of the driver seat. This effect is enhanced when a plurality of runners 52 are provided in the guide member 51 so that the guide member 51 is held on a broad base in the supporting arm 50.

Conductors, cables and other wirings are passed from the driver seat 18 along the guide member 51 to the engine and the main and auxiliary tools of the tractor 1. In order to avoid rupture or other damage of these conductors a flexible guide gutter or tube 53 is coupled with the guide member 51, as is shown in FIG. 4. The gutter or tube 53 of synthetic resin is connected by the end portion 54 with the tractor 1. In this way the cables, conductors and wirings are passed via the profile 51 from the cabin 18 through the gutter or tube 53 to the engine 8 of the tractor 1 so that damage or rupture thereof is effectively avoided.

FIGS. 6, 7 and 8 show a preferred embodiment of the connection of a pivotal arm with a cabin of a tractor as shown in FIGS. 1 and 2. The pivotal arm 42, as shown in the cross sectional view of FIG. 5 is hollow and has a substantially rectangular shape. It is advantageous that the supporting arm accommodates all conductors required for steering the tractor, for actuating the machinery or tools attached to the tractor and for controlling the tractive force. The conductors may be hydraulic ducts 55, mechanical connections such as Bowden cables 56 and electrical conductors 57. A bunch of leads is passed from the cabin 18 through the pivotal arm 42 to the main and auxiliary tools, the leads being bunched in the opening 60 of the supporting arm 42 by means of a coupling, a bracket or a rod 58 fastened to the supporting arm 42.

In an advantageous embodiment this coupling or bracket 58 is formed by a plurality of segments 59 of flexible, solid material. This coupling is otherwise free of the opening 60 of the arm 42. In a further structure (not shown) the coupling 59 may be fastened by means of an elastic tape or strip to the edge of the opening 60 or to a ring 61 near the opening of the pivotal arm. The ring 61 is welded to the arm 42, as is shown in FIG. 7, whereas a flat ring 62 is held by bolts 63 at a distance above the ring 61. Between the two rings 61 and 62 a ball bearing or roller bearing 64 is arranged. The bottom portion 65 of the cabin 18 comprises a ring 66 fastened by welding and having a rectangular section and a second flat ring 68 held at a distance by bolts 67. Between these rings a similar ball bearing 64 is clamped tight, which is also held between the rings 61 and 62 of the pivotal arm 42. The construction described provide in a simple manner the possibility of turning the pivotal arm 42 with respect to the cabin 18.

The structure shown in FIGS. 6 to 8 provides a satisfactory protective passage, while the turn of the cabin with respect to the arm or conversely can be performed without any difficulty. In the same manner as shown in FIG. 7, the bunch of leads is passed at the other end portion 42A (FIG. 2) of the arm 42 into the frame 5 towards the main and auxiliary tools and machines of the tractor and to the engine 8 and the control-mechanisms of the tractor.

As is shown in the side elevation of FIG. 9, which shows only part of the cabin 18, the latter is provided with a door 69, which is hinged to the top side of the cabin. The door 69 comprises a tubular frame 70, which holds on the lower side the dash board 71 as well as the steering device 72. On the lower side of the frame 70 the head lights 73 of the vehicle are arranged. A locking mechanism 74 is provided at the lower end of the steering column 75. In a simple construction said mechanism is formed by a locking pin 76, a spring rod 77 and a lever 78 on the instrument board 71. By means of the mechanism 74 the door 69 of the cabin 18 is locked in place, while the mechanism 74 can be actuated from the instrument board 71. From the dash board 71 leads or cables 79 forming part of the control-system of the tractor and of the machines attached thereto extend through the tubes 70 of the door 69. The leads or cables pass through the tubes 70 and through a tublar hinge 80 via the walls of the cabin 18 to the control-apparatus of the main and auxiliary tools and machines attached to the tractor. When the tractor driver has to leave the cabin he only needs turn the handle 78 on the dash board 71 so that the locking mechanism 74 between the door and the cabin in discoupled, and, for example, by pushing the steering wheel 72, he can swing the door 69 open and get out of the cabin 18. Between the door 69 and the cabin 18 a locking member 81 is provided for holding the door in the opened position so that the driver can easily get in and out. There is furthermore provided a step 82 on the left-hand front wheel of the tractor, which also facilitates these movements. The locking pin 76 projects from the door 69 over a distance such that it can always be manipulated from without.

By means of the lifting cylinders 27 (FIGS. 1 and 2) a loading floor, a machine and/or a tool can be arranged on the top side of the tractor, the lifting cylinders 27 remaining coupled with said parts in operation. FIGS. 10 and 11 show by way of example an excavator arranged on the tractor.

As is shown in FIGS. 10 and 11 the excavator comprises a frame 83 having two longitudinal supporting beams 84 and 85, which are interconnected by transverse beams (not shown). At the front the frame 83 is provided with supporting members 86 and 87, to which a rod or arm 88 and 89 respectively is hinged and with hydraulic cylinders 90. In this preferred embodiment the frame 83 of the machine has coupled with it a digging tool formed by an endless conveyor 91. The coupling of the tool with the frame is located near the center of the frame 92 of the conveyor. The conveyor 91 comprises mainly a flexible conveyor belt 93 passed around the rollers 94 and 95. The rollers 94 and 95 are fastened to shafts 96 and 97 respectively. The flexible conveyor belt 93 is provided with digging elements 98 formed by buckets, the edges 99 of which are adapted to uniformly penetrate into the soil for the digging operations. A conveyor 100 joins the digging tool 91 and has its frame 101 connected by the end portions 102 with the longitudinal beams 84 and 85 respectively. The conveyor 100 also comprises rollers 105, fastened to shafts 103 and 104, along which a flexible conveyor belt 106 is passed. The shafts 104 and 97 are provided with chain sprockets 107 and 108 respectively (see FIG. 11), along which chains 109 are passed. Near the bottom side of the conveyor 100 a collecting gutter 110 extends transversely of the direction of movement (arrow A) of the excavator. Approximately near the center the frame 101 of the conveyor 100 is held by beams 111, the ends 112 of which are secured to the longitudinal beams 84 and 85 respectively. In a preferred embodiment the frame 101 of the conveyor 100 is at an angle of about 30° to the longitudinal beams 84 and 85 respectively. A loading trough 113 joins the conveyor 100 at the rear of the frame 83 of the excavator, said trough being preferably rotatably connected with the frame. For this purpose the lower edge 114 of the loading trough 113 is fastened to a disc 115, while the walls 116 are secured by means of supports 117 to an edge of the disc 115. The disc 115 is rotatable about the shaft 118, which, in this embodiment, is located between the edge 114 and the supports 117 of the loading trough 113. The disc 115 is furthermore provided with a bracket 119, which is adapted to be fastened to the eyelet 37 of the piston rod of a hydraulic cylinder 120. The hydraulic cylinder 120 is detachably fastened to the frame 83 of the excavator, for which purpose a transverse beam (not shown) between the longitudinal beams 84 and 85 is provided with a bracket 121, which is adapted to couple the end portion 122 of the cylinder 120 by means of a locking pin 123 with the frame 83. By means of ducts (not shown) the cylinder 120 communicates with a hydraulic pump the pressure of which is controllable in known manner. The loading trough 113 comprises in this preferred embodiment a roller floor 124, also formed by a flexible conveyor belt so that the dug-up material can be conveyed in unfiorm manner. The longitudinal beams 84 and 85 are furthermore provided with supports 125 and 126 respectively, which are formed in a preferred embodiment by extensible tubes 127 and 128 respectively. The tubes of each support can be fixed at various heights with respect to each other by means of a locking pin 129. By means of the foremost supports 86, 88 and 87, 89 respectively and the hindmost supports 125 and 126 the frame 83 with the excavator 91, the conveyor 100 and the collecting trough 113 can be displaced upwardly, the height being fixed by means of the locking member 129. The frame is held on comparatively broad feet 130 so that satisfactory stability of the machine is obtained.

The lifting cylinders 27 of the tractor 1, which is similar to the tractor 1 described above, comprise extensions 131, which fit in slots of the longitudinal beams 84 and 85, the cylinders being thus detachably connected with the frame 83 of the excavator by means of the locking pins 132. It is preferred to use a combination of the machine and a tractor in which the tractor is equipped on either side with an adjustable track 133 and 134 respectively between a front wheel and a rear wheel. The track 133 and 134 are fastened for this purpose to a supporting frame 135 and 136 respectively, which comprises a parallelogram of rods and shafts 137, by means of which the track are adjustable in a direction of height. The track are displaced by means of the hydraulic cylinders 138. A cylinder 138 is capable of displacing the tracks in an upward direction via the arms 139 connected with supporting frame 135 of the tracks and via longitudinal shafts 140 coupled herewith and forming part of the parallelogram structure 137 of rods and shafts. The ends of the cylinders 138 and their piston rods are connected for this purpose with the frame 5 and with the arms 139. The track moves upwardly parallel to itself. By employing track tires of the kind shown in FIGS. 10 and 11 the initial pressure of the digging tool 91 can be increased under practically any condition. Apart from the increase in initial pressure the angle of penetration of the digging tool into the soil is important. According to the invention the cylinders 90 are coupled for this purpose on the one hand with the frame 92 of the excavator and on the other hand with the supporting member 86, 87 of the frame 83 on the tractor 1 for adjusting the frame 92 of the excavator 91.

The combination shown in FIGS. 10 and 11 is formed and will operate as follows. For combining the excavator with the tractor the frame 83 with the digging tool 91, the conveyor 100 and the trough 113 bear on the supporting means 86, 88 and 87, 89 and 127 and 128 respectively, adjusted to the correct height. The conveyor may be turned upwardly so that its lower point is located at a higher level than the top side of the frame 5 of the tractor. This height depends furthermore upon the height of the frame of the tractor 1 and upon the position of the lifting cylinders 27, with which the frame 83 of the machine has to be coupled. The driver seat 18 of the tractor enclosed in the cabin is swung by means of the supporting arm 42 out of the central position, as described with reference to FIGS. 1 and 2, so that it is located near the front of a front wheel 2 (FIG. 11), the complete space above the frame 5 being available for the machine. Then the tractor 1 is driven from aside in between the supports until the extensions 131 of the lifting cylinders 27 arrive at the level of the recesses of the longitudinal beams 84 and 85 respectively. This manoeuver is enabled by the very small circle of rotation of the tractor, since all wheels are steerable. The lifting cylinders 27 are then adjusted upwardly so that the extensions penetrate completely into the slots of the longitudinal beams 84 and 85, the frame 83 and the cylinders 27 being then connected with each other by means of the locking pins 132. By slightly increasing the pressure in the lifting cylinders 27 the frame 83 is lifted as a whole from the ground so that by releasing the locking pins 129 supports can be shortened or turned respectively. The extensible tubes are locked in their relative positions by the same locking pins 129, while the supports 88 and 89 are pivoted relatively to the members 86 and 87 respectively and are fixed in a horizontal position by means of the same locking pins 129. By subsequently decreasing, from the driver cabin 18, the pressure of the lifting cylinders 27, the frame 83 with the digging tool, the conveyor and the loading trough is moved to a position directly above the frame 5 of the tractor so that the assembly can be transported to the working site. At the site where soil, gravel or similar material has to be dug the excavator 91 is moved by means of the cylinder 90 from the substantially horizontal transport position into the inclined working position and if necessary, the tracks are simultaneously disposed on the ground, so that a high force of penetration of the digging tool can be produced. It should be noted that the tracks 133 and 134 may be driven via the power take-off shaft(s) of the tractor. By subsequently actuating the driving device (not shown) of the digging tool 91, the chains 109 of the conveyor 100 and, if desired, the rolling floor 124 and by causing the tractor 1 to move, the digging operation is performed. In this embodiment the digging buckets 98 are passed by the conveyor belt 93 across the ground surface to dig up the material, after which they move upwardly. Each digging bucket 98 will shed the dug-up material during its reverse movement on the conveyor 100. The conveyor 100 will shed the collected material into the trough 113. If necessary the rolling floor 124 can be actuated for removing the quantity of material from the loading trough so that the material can be collected in a truck or loading trough (not shown) coupled with the rear of the tractor. If desired, the disc 115 and hence the loading trough 113 can be pivoted by means of the cylinder 120 into the positions indicated by broken lines in FIG. 11 through an angle of about 90° so that the loading trough 113 can also be emptied in a direction transverse of the longitudinal axis of the tractor by means of the rolling floor 124.

FIGS. 12 and 13 show the combination of an excavator and a tractor, the excavator 140 being suitable for special purposes. It should be noted that similar parts of the combination shown in FIGS. 10 and 11 and of FIGS. 12 and 13 are designated by the same reference numerals. The excavator 140 comprises, as is shown in FIGS. 12 and 13, a digging portion 141, behind which elevators 142 and 143 are arranged, which are followed by delivery portions 144 and 145. The digging portion 141 comprises tines 146 arranged in rows, for tearing up the surface of the soil, (FIG. 13) and for conveying the soil between the elevators 142 and 143. On the rear side of the digging tines 146 a roller or shaft 147 is provided for supporting the tines 146. The elevators 142 and 143 are mainly formed by endless belt conveyors, the directions of movement of which are indicated in FIG. 12 by arrows. The frame 148 of the conveyor 142 comprises on the bottom side a slot 149, in which fits a shaft 150 of the frame 151 of the elevator 143, where it is held. The bottom side of the frame 148 comprises furthermore a plate 152 with openings 153, each one of which registers with one opening in the frame 151 of the conveyor 143. The corresponding openings are adapted to receive a locking pin 154. The elevator 143 comprises a flexible conveyor belt 155, passed along the rollers 156 and 157. The shaft 158 of the roller 157 is provided with a chain sprocket 159, along which a chain 160 is passed, which is furthermore passed along a chain sprocket 161 of a shaft 162, journalled in the frame (see FIG. 13). The shaft 162 is provided with a gear wheel 163, which is in mesh with a gear wheel 164 on a shaft 165 journalled in the frame 148. The frame 148 holds shafts of the rollers 166 and 167, along which is taken an endless conveyor belt 168. The shaft 165 forms at the same time the driving shaft for the rollers 166 of the elevator 142. By means of a chain and sprocket system the elevator 145 is in driven connection with the conveyors 142 and 143. For this purpose a chain 169 is passed not only along the chain sprocket 164 but also along a chain sprocket 170, which is fastened to the shaft 171 of the frame 172 of the conveyor 145. The shaft holds rollers 173 along which the flexible conveyor belt 174 is passed. A shaft 175, journalled in the frame 172, is held in this preferred embodiment in a column 176. Nearer the shaft 171 of the frame 172 of the conveyor 145 the operational cylinder 90 has its coupling point 177. In this preferred embodiment the excavator 140 is supported correctly near the lower side of the frame 148 by supporting arms 178 and 179, which are pivoted to the shaft 171 of the frame 172. Moreover, the arms 178 and 179 are provided with supporting members 180, by means of which lifting of the excavator 140 is considerably enlightened so that during the lift with the aid of the cylinder 90 sagging of the excavator is avoided in a simple manner. On the top side the frame 148 is provided with a collecting trough 144 mainly of triangular shape, opening out above the conveyor 145. The column 176 is arranged just in front of the front axle of the tractor 50. A chain-and-sprocket drive 181 is employed between the conveyors 145 and 100.

The excavator shown in FIGS. 12 and 13 operates as follows. The soil material located in front of the digging tines 146, for example, gravel is guided by the initial force of the excavator, which may be appreciably increased by the tracks 133 and 134 of the tractor, towards the elevator 142. The material is conveyed to a given height above the ground by means of the conveyors 142 and 143 in a direction of height. It is advantageous that the conveyor 143 can be arranged at an adjustable distance from the conveyor 142 by means of the adjusting means 152, 153 and 154, so that in a first instance the dug-up material, supported by a portion of the conveyor 143, can be conveyed more easily along the inclined conveyor 142 in the upward direction. Owing to this particular structure the excavator is fairly compact, while its elevation capacity is nevertheless fairly high. The dug-up material is then shed on the collecting trough 144 and arrives, owing to the downwardly inclined position of the collecting trough, at the conveyor 145. Then the material is conveyed by the conveyor 145 towards the conveyor 100, from which the material drops into the trough 113. Like with the combination of the excavator and the tractor shown in FIGS. 10 and 11 the dug-up material can be transferred to a truck hitched to the tractor. The excavator is coupled with the tractor in the same manner as in the case of the combination of FIGS. 10 and 11. The combination of the tractor 1 and the excavator 140 provides a digging machine which permits of cutting off effectively special ground material, for example, strips of turf and conveying the same further. The force of penetration and the angle of penetration of the digging tool is fairly high and adjustable over a large angle respectively.

FIGS. 14 and 15 show a further embodiment of the combination of an excavator and a tractor, in which in particular the pressing surface of the tractor on the ground may be many times larger than in the embodiments described above. For this purpose the tractor 1 comprises three tracks 182, 183 and 184; the tracks 182 and 184 are fastened to the two-point lifting device 185 and to a three-point lifting device 186 respectively. The tracks 183 and 184 are driven from the hindmost power take-off shaft 187 of the tractor, which shaft is linked to the drivable shafts 188 and 189 respectively of the caterpillars 183 and 184 respectively by means of the auxiliary shafts 190 and 191 respectively. The track 182 is also in driven connection via the auxiliary shaft 192 with the foremost power take-off shaft 193 of the tractor. It should be noted that the frame structures 194 and 195 of the caterpillars 182 and 184 respectively are similar. The track 183 comprises otherwise the same lifting members 135, 136, 137 and 138 as described with reference to the preceding Figures. The frame 83 of the machine shown in FIGS. 14 and 15 comprises a fairly high column 196, in which are journalled the shafts 197 and 198 of the conveyors 199 and 200 respectively. In this embodiment the longitudinal center line 201 of the column 196 crosses the front axle of the tractor approximately at right angles and, viewed at right angles to the direction of movement of the tractor 1, the center line is located behind the front axle. At the front of the tractor a digging tool 202 is arranged, which comprises in this embodiment two separate worm conveyors 203 and 204 (see FIG. 15), by means of which gravel, soil and suchlike material can be conveyed from the side of the tractor towards the center of the conveyor 199. The worm conveyors 203 and 204 are fastened to a shaft 205, the ends of which are journalled in a broad digging trough 206, which forms the digging tool proper and which is secured to the frame 207 of the conveyor 199. The conveyor 199 also comprises a flexible, endless conveyor belt, which is driven by means of chains and gear wheels 208. It should be noted that the drive of the chains and sprockets (not shown in detail in the Figure) may be drived from the power take-off shaft via a gear wheel reduction casing of the tractor 1. Behind the conveyor 199 a conveyor 200 is arranged on top of the frame 83. The end portion of the conveyor 200 near the shaft 198 is journalled in the column 196 and at a distance of about two-thirds of the length of the frame 209 a lifting cylinder 210 is pivoted by means of an eyelet 211 thereto. The conveyor 200 has a length approximately equal to the length of the frame 83 of the excavator. The frame 83 comprises in this embodiment at the front only one supporting member 212, the structure of which is otherwise similar to that of one of the supporting members 125 or 126 at the rear of the frame 83 of the combination shown in FIGS. 10 to 13. The frame 207 of the conveyor 199 is held near the center by one or more cylinders 213, which are pivoted one end to the frame 207 and at the other end to the frame 5 of the tractor 1. In this embodiment the two conveyors 199 and 200 are also hinged at the ends to the column 196 and to the hydraulic working cylinders 210 and 213 respectively. These cylinders can be actuated from the driver cabin.

The combination of the excavator and the tractor shown in FIGS. 14 and 15 operates as follows. The broad trough 206, forming the digging tool, digs up during its movement the material located in front of the tractor, while the worm conveyors 203 and 204 convey the dug-up material to the conveyor 199. The initial pressure of the digging tool 206 may be increased according to need by switching on the tracks one by one or simultaneously, while by means of the cylinders 213 an advantageous angle of penetration of the digging tool 206 relative to the ground can be adjusted. The dug-up material is conveyed on by the conveyor 199 to the conveyor 200, from where it is shed in a truck or transport vehicle (not shown) for further transport.

It should be noted that for assembling the combination, in which the frame 83 is held by the supporting members 86, 88; 87, 89, 125, 126 and 212 the digging tool at the front of the frame 83 gives rise to difficulties in running-in of the tractor 1 so that the supporting portion of the tractor 1 cannot be driven either from the rear or from the front of the standing excavator to beneath the frame 83 of the machine. However, when using a tractor embodying the invention, the the frame 5 of said tractor not being wider than the distance between the longitudinal beams 84 and 85 of the frame 83 of the excavator, the tractor can be driven from the side of the excavator on between the foremost and hindmost supporting members so that finally the tractor frame 5 extends in the longitudinal direction of the frame 83 of the excavator. Manoeuvring of the tractor beneath the frame 83 is considerably facilitated by the pivotal arrangement of the driver seat on the arm 67 of the tractor, while all wheels are steerable. As a matter of course, it is often simpler to arrange the standing excavator so that the lowermost point of the digging tool 206 is located above the lowermost point of the frame 83. This situation is already obtained when the tractor after use of the excavator has been driven from beneath the machine, during which manoeuver the digging tool 202 is already swung upwards. Then the tractor can be driven in the reverse to beneath the machine.

As is shown in FIGS. 16 and 17 a fourth combination of a tractor 1 and a soil displacing machine 214 is arranged so that the machine is coupled with the foremost two-point lifting device 215 of the tractor. The soil displacing machine 214 is equipped with a frame beam 216, extending transversely of the direction of movement A, and provided in this embodiment with extensible frame portions 217 and 218. At the open ends the frame beam portions 217 and 218 are provided with vertically extensible supporting tubes 219 and 220, which can be fixed by means of a locking pin 221 at a given height relative to the frame beam 218. At the lower ends the telescopic supporting members 219 and 220 are provided with a broad, rectangular foot plate 222, by means of which the machine 214 can stand independently of the tractor 1. On the top side the frame beam 216 is provided with a supporting frame 223 comprising fastening strips 224, to which supporting arms 226 are fastened so as to be pivotable about a shaft 225, which arms are connected by means of a locking and adjusting member 227 with lifting rods 228 and 229 of the two-point lifting device 215. In this preferred embodiment the locking and adjusting member 227 comprises a setting plate 230, fastened to the lifting arms 228 and 229 of the lifting device 115 and provided with openings for passing and accommodating a locking pin 231. The openings register with an opening in the supporting arm 226, so that the latter is fixed on the one hand via the supporting frame 223 on the frame beam 216 of the soil displacing machine and on the other hand to the lifting arms 228 and 229 of the lifting device 215. The frame beam 216 is furthermore hinged by means of fastening strips 232 to the lifting arms 228 and 229 of the lifting device 215.

The fastening structure of the supporting beam 216 on the lifting device and the use of supporting members on the frame beam 216 provide satisfactory stability of the combination of the soil displacing machine and the tractor in operation. Near the center the frame beam 216 is provided with a cylindrical member 233, to which fastening plates 234 are secured. Pivotal shafts 235 and 236 are secured to the fastening plates 234 for the hydraulic cylinder 237 and the supporting arm 238 of the soil displacing machine 214. The fastening plate 234 is furthermore coupled with a hydraulic cylinder 239, the other coupling point of which is pivotal to a bracket 240 of the frame beam 216.

The above coupling of a supporting arm 238 with the frame beam 216 permits in a simple manner a movement of a tool fastened to the arm 238 both in a vertical and in a horizontal plane. The cylinders 237 and 239 are energized from the driver cabin 18 or from a control-device 241, arranged at the side of the tractor so that these cylinders may also be actuated from the outside of the cabin. The machine 214 comprises furthermore supporting arms 242 and 243 and a group of pivotal arms 244, which are capable of moving in known manner a loading shovel 245 into various working positions. For this purpose the cylinder 237 is coupled between the fastening plates 234 and 246 of the supporting arm 238 and a cylinder 247 is fastened between the plate 246 and the arm 242, whilst the cylinder 248 is arranged between the arm 243 and the arms 244 of the loading trough 245.

FIGS. 18 and 19 show the combination of a soil displacing machine, particularly a loading shovel, and a tractor of the same construction as that shown in the preceding Figures. The soil displacing machine or loading shovel 249 comprises preferably a ladle or loading trough 250, which is provided at the front with digging elements 251, with the aid of which the soil is torn up. The trough 250 is pivoted with the aid of the extensions 252 and 253 to the arms 254 and 255, the connection being established by means of pins 256. A hydraulic cylinder 257 is coupled at one end with the bottom side of the trough 250 and at the other end to a connecting beam 258 of the supporting arms 254 and 255. The end portions 259 and 260 of the arms 254 and 255 respectively remote from the trough 250 are pivoted to a portal 261 and, if desired, they are reinforced by a beam 262, extending transversely of the direction of movement. The portal 261 in this preferred embodiment comprises two substantially triangular supporting walls 262 and 263, which are interconnected above by means of a transverse beam 264. At the bottom the supporting walls 262 and 263 have supporting elements 265, holding pivotal shafts 266 suitable for coupling the fastening eyelets of the hydraulic cylinders 267. The cylinder 267 is pivoted by the piston rod 268 to a fastening bracket 269 of a supporting arm 254 and 255 respectively. The portal 261 of this soil displacing machine or loading shovel 249 bears on a frame 270 comprising mainly two longitudinal beams 271 and 272 and two transverse beams 273 and 274 connected therewith. The longitudinal girders 271 and 272 have recesses 275 of a shape such that they can receive a coupling member 131 of the vertically operating lifting cylinders 27. The coupling of a longitudinal girder with a coupling member 131 of a lifting cylinder 27 is established in a simple manner by means of a detachable locking pin 276, which can be passed through an opening in the coupling member and through an opening in a longitudinal girder 271 or 272 respectively. In this preferred embodiment the distance between the transverse beam 264 and the frame 270, to which the portal walls 262 and 263 are fastened, is greater than the maximum height of the cabin 18, when the beam 262 is omitted.

In this embodiment the frame 270 is provided at the front with a supporting member 277 and at the rear with supporting members 278 and 279. The supporting member 277 is mainly formed by telescopic tubes of shafts 280 and 281, which can be fixed by means of a locking pin 282 at the desired height above the ground relatively to each other. The extensible tube or shaft 280 is provided with a broad foot plate 293. The supporting members 278 and 279 in this embodiment are also formed by the extensible tubes or shafts 284 and 285 having a broad foot plate 286. The tubes 284 and 285 are also relatively fixed in place by means of the locking member 287. The supporting members 278 and 279 are pivotable about the center lines of the horizontal shafts or beams 288 and 289 respectively and can be fastened with the aid of locking pins 290 to brackets 291 so as to be detachable. A shaft 288 or 289 is for this purpose integral with a supporting tube 278 or 279 respectively, while the shaft 288 or 289 is provided near one end with an opening 292, which registers with an opening in a bracket 291 subsequent to a turn of a support 278 or 279 and subsequent to the displacement of a shaft 288 or 289 respectively. The two openings can receive the pin 290, so that in a simple manner the distance between the supporting tubes 278 and 279 can be enlarged at least to the track width of the tractor 1. By means of these extensible supports the frame 270 of the digging shovel can be fixed at such a height above the ground that for assembling the combination of the shovel 249 and the tractor 1 the tractor can be driven from the rear side of the frame 270 between the hindmost supporting members 278 and 279 to beneath the frame 270 with its frame 5. This is also rendrered possible by the dimensions of the portal 261. After the frame 5 of the tractor 1 has been arranged at the correct distance beneath the frame 270 of the machine 249, the hydraulic lifting cylinders 27 are energized until the extensions 131 get into the recesses 275 of the longitudinal girders 271 and 272, after which they are locked in position by means of the locking pin 276. By increasing the pressure of the lifting cylinders 27 the machine is lifted from the ground so that the supporting members 277, 278 and 279 get free of the ground and can be shortened or tilted. Then the pressure in the lifting cylinders is decreased to an extent such that the frame 270 of the machine now integral with the frame 5 of the tractor 1 gets at the suitable driving height, so that the combination is ready for transport.

FIGS. 20 and 21 show a combination of a soil displacing machine and a tractor embodying the invention, said tractor corresponding with the tractor 1 described with reference to the FIGS. 1 to 5. The tool coupled with the front of the tractor comprises a comparatively heavy frame beam 293, which is coupled by the end 294 with coupling means 295 with the two-point lifting device 28 of the tractor 1. In this embodiment the lifting device 28 comprises two comparatively short lifting arms 33 and 34, between which a transverse beam 296 is pivotally arranged, which beam is suitable for connecting a coupling member 295 of the frame beam 293. The coupling member 295 has the shape of a bracket and has openings for passing a locking pin 297. The transverse beam 296 has approximately near its center an opening for receiving the locking pin 297. In this manner the frame beam 293 is coupled with the lifting device 28 of the tractor 1. The comparatively short lifting arms 33 and 34 are arranged on a shaft 35 (see FIGS. 1, 2 and 20), which shaft is pivoted to the front axle 3.

At the other end the frame beam 293 is provided with a housing 298 pivotally accommodating the end portion 299 of the frame beam 293. The housing 298 is fastened to a shaft 300, on which ground wheels 301 and 302 are arranged. With the aid of steering rods 303 the wheels 301 and 302 are controlled via a hydraulic control-member or pump 304, which is arranged in the housing 298. Through hydraulic ducts 305 the hydraulic pressure is allowed to pass from the cabin 18 to the hydraulic control-member 304 so that the track rod 303 of the ground wheels 301 and 302 is displaced. By means of the pivotal connection 299 of the frame beam 293 in the housing 298 the shaft 300 is also movable about a horizontal shaft extending in the direction of movement. In this preferred embodiment the ground wheels 301 and 302 can be adjusted simultaneously in the same direction obliquely to the vertical plane. This adjustability is indicated in FIG. 21 by the broken lines 306 and 307. In this way a reactive force not working in the longitudinal direction or in a direction transverse of the frame beam, but being at an acute angle thereto is compensated for in a simple manner so that the steerability of the combination is hardly affected by a reactive force or reactive forces applied obliquely to the frame beam. Such a reactive force is produced since the soil displacing machine 308, formed in this embodiment by a curved steel plate 309 levels out unevennesses of the ground during its travel oblique to the direction of the plate.

In the position shown in FIG. 21 the reactive force would be approximately at right angles to the center line of the soil plane 308. This reactive force will produce at the wheels 301 and 302 in the position shown in solid lines a lateral reactive force so that the tool coupled at the front of the tractor 1 tends to turn away laterally. By arranging the ground wheels 301 and 302 into an inclined position to the vertical plane, i.e. into the positions indicated by broken lines 306 and 307, this lateral reactive force is better absorbed by the wheels so that especially in the event of loose soil the tendency of the soil plane to turn away is obviated. The steel plate 309 is provided at intervals with stiffening ridges 310 on the curved surface of the plane and near the centre the plate 309 is provided with a shaft 311, which is rotatably journalled in a supporting frame 312, which is connected with the frame beam 293 preferably so as to be adjustable and detachable. The shaft 311 is fastened to a pinion 313, which is in mesh with a gear wheel 314 of an adjustable source of energy 315. The source is preferably formed by a hydraulic pump, which can be controlled via hydraulic ducts 316 from the cabin 18 of the tractor 1. It should be noted that as an alternative an electric motor of adequate capacity may be used instead of the hydraulic pump 315. The shafts 311 is furthermore rotatably journalled in a sleeve 317, which forms part of the supporting frame 312. The frame 312 comprises two channel-section beams 318 and 319 having openings 320 suitable for receiving fitting bolts 321, by means of which the beams 318 and 319 can be fastened to the frams 293. The beams 318 and 319 are furthermore supported by means of struts 322 and 323 orientated to the front of the frame beam 293. The struts 323 and 322 are adjustably fastened to the frame beam 293 with the aid of the angular supports 324 and 325 respectively, which are also provided with openings 320. The frame beam 293 has openings registering with the openings in the angular supports 324 and 325, through which bolts 321 can be passed. The driving member 315 is adjustable together with the supporting member 312.

By means of the combination shown in FIGS. 20 and 21, in which a soil displacing machine formed by the soil plane 309 is arranged at the front of the tractor 1 on a frame 293 provided with ground wheels, the soil can be levelled effectively. The soil planing tool proper 309 is adapted to turn through 360° at the center of the frame beam 93, which movement can be controlled from the displaceable driver cabin 18. The driver cabin 18 in this combination of FIGS. 20 and 21 is located between the front wheels in the central position, since this position is the most favourable one for use of such a tool. By using a hydraulic control-system 315 and 316, by means of which the gear wheel 314 displaces the pinion 33 on the shaft 311 of the soil plane 309 the tool 309 can be easily turned into different angles to the direction of movement (arrow A) so that a satisfactory and rapid adaptation of the machine to various soil situations can be obtained.

The invention thus introduces road construction machines which are, in fact, combinations of excavators, conveyors and a tractor or a levelling machine and a tractor, in which in the first place a very high starting pressure can be obtained and in the second place the angle of action of the tools can be caused to match the circumstances. Moreover, the constitutant of the combination i.e. the tractor is always available for other operations, for example, for carrying other tools, machines, loading floors and the like so that an important economy of capital goods is obtained because the total amount of investments is considerably reduced. Moreover, because it can be combined with different kinds of machines the tractor is employed quite intensely so that the cost of exploitation is favourable.

The invention is not restricted to the data given in the above specification or in the following claims and also relates to the details of the Figures, whether described or not.

What we claim is:

1. A tractor comprising a wheeled frame and a displaceable driver seat positionable at the forward end and laterally of said frame, a plurality of vertical lifting members being supported on said frame to receive a detachable implement, said implement comprising an earth digging tool having frame means with adjustable support elements connected thereto to hold the implement above the ground, independant of the tractor whereby the tractor can be moved under the implement and attached to said implement, said implement having an operating digging tool extending in front of said frame and driver seat, said tool being pivotally connected to said frame means, said frame means comprising an adjustable support and a conveyor mounted on said support, a hydraulic cylinder interconnecting said support with the frame means to raise and lower same.

2. A tractor comprising a wheeled frame and a displaceable driver seat positionable at the forward end and laterally of said frame, a plurality of vertical lifting members being supported on said frame to receive a detachable implement, said implement comprising an earth digging tool having frame means with adjustable support elements connected thereto to hold the implement above the ground independent of the tractor whereby the tractor, including the frame, can be moved under the frame means of the implement and attached to said implement, said implement having an operating digging tool including at least one conveyor positioned adjacent the front end of said tractor to receive dugup material from the tool and convey same to the rear of the driver seat, said tool being pivotally connected to said frame means and hydraulic cylinder means operatively connected to said digging tool to move same, said cylinder means being secured to said frame means.

3. A tractor as claimed in claim 2, wherein said frame means includes beams and there are at least four support elements connected to said beams, said vertical lifting members of the frame being interfitted with said beams.

4. A tractor as claimed in claim 2, wherein said vertical lifting members are connected to the frame means of the implement.

5. A tractor as claimed in claim 2, wherein a two point lifting device is connected to the forward end of said frame below said driver seat, said lifting device having coupling means for connecting same to the implement.

6. A tractor as claimed in claim 2, wherein a loading trough is mounted on said frame to receive the material from said conveyor.

7. A tractor as claimed in claim 6, wherein there are a plurality of conveyors that communicate with one another positioned between the digging tool and the loading trough.

8. A tractor as claimed in claim 6, wherein said trough is pivotally mounted on the upper surfaces of said tractor.

9. A tractor as claimed in claim 2, wherein the width of the digging tool is at least equal to the width of said frame and greater than the width of the wheels supporting the frame.

10. A tractor as claimed in claim 2, wherein said implement is coupled at the front of the tractor and said support elements include at least two telescopting supports which are displaceable laterally with respect to the driver seat to support the implement.

11. A tractor as claimed in claim 1, wherein a loading trough is pivotally mounted on said frame to the rear of said driver cabin, said trough having a conveyor floor and being pivotable to position said floor at right angles to said conveyor.

12. A tractor comprising a wheeled frame and a displaceable driver seat positionable at the forward end and laterally of said frame, a plurality of vertical lifting members being supported on said frame to receive a detachable implement, said implement comprising an earth digging tool having frame means with adjustable support elements connected thereto to hold the implement above the ground independent of the tractor whereby the tractor, including the frame, can be moved under the frame means of the implement and the lifting members attached to said implement, said implement having an operating digging tool extending in front of said frame and driver seat, said tool being connected to arm means which extends to the rear of the driver seat and said arm means being connected to said frame means, hydraulic cylinder means operatively connected to said digging tool to move same and said cylinder means being secured to said frame means.

13. A tractor comprising a wheeled frame and a displaceable driver seat positionable at the forward end and laterally of said frame, a plurality of vertical lifting members being supported on said frame to receive a detachable implement, said implement comprising an earth digging tool having frame means with adjustable support elements connected thereto to hold the implement above the ground independent of the tractor whereby the tractor can be moved under the frame means of the implement and attached to said implement, said implement having an operating digging tool extending in front of said frame and driver seat, said tool having arm means pivotally connected to said frame means, hydraulic cylinder means operatively connected to said digging tool to move same, said cylinder means being secured to said frame means, said implement being coupled to the front of the tractor and said support elements comprising at least two telescoping supports which are displaceable laterally with respect to the driver seat to support the implement.

* * * * *